United States Patent
Kurup et al.

(10) Patent No.: US 6,491,612 B1
(45) Date of Patent: Dec. 10, 2002

(54) STUD WELDING TOOL CHANGER

(75) Inventors: Prasaad Balakrishnan Kurup, Raleigh, NC (US); James H. Snape, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 147 days.

(21) Appl. No.: 09/694,422

(22) Filed: Oct. 23, 2000

(51) Int. Cl.[7] ............................ B23Q 3/155; B23K 9/20
(52) U.S. Cl. ........................ 483/16; 483/69; 483/901; 901/42; 285/268
(58) Field of Search ................... 403/359.4; 483/69, 483/901, 16, 19; 901/41–42; 219/98, 86.25, 136; 285/317, 268, 269, 266, 146.2, 146.3; 414/729, 730; 227/58, 69, 70; 29/243.54

(56) References Cited

U.S. PATENT DOCUMENTS

| | | |
|---|---|---|
| 3,309,495 A | 3/1967 | Shoup et al. |
| 3,348,291 A | 10/1967 | Niedzwiecki |
| 3,367,015 A | 2/1968 | Brosene, Jr. |
| 3,647,129 A | 3/1972 | Ehrlich |
| 3,653,693 A | 4/1972 | Wieland et al. |
| 4,409,464 A | 10/1983 | Favareto et al. |
| 4,454,775 A | 6/1984 | Ellis |
| 4,469,928 A | 9/1984 | Wikinson et al. |
| 4,611,377 A | 9/1986 | McCormick et al. |
| 4,620,079 A | 10/1986 | Allmann et al. |
| 4,620,656 A | 11/1986 | McClay et al. |
| 4,633,053 A | 12/1986 | Puthran |
| 4,635,328 A | 1/1987 | Palmér |
| 4,636,135 A | 1/1987 | Bancon |
| 4,652,203 A | 3/1987 | Nakashima et al. |

(List continued on next page.)

FOREIGN PATENT DOCUMENTS

EP    0216261    9/1986

OTHER PUBLICATIONS

ATI Product Manual, Stud Welding Tool Changer, 9610–20–1017–02, copyright 2000.*

*Primary Examiner*—A. L. Wellington
*Assistant Examiner*—Erica Cadugan
(74) *Attorney, Agent, or Firm*—Moore & Van Allen PLLC; Michael G. Johnston

(57) ABSTRACT

Disclosed is an apparatus for passing solid objects for use in a robotic tool changing system. The apparatus comprises a housing mounted on either a master assembly or a tool assembly. A tubular member is disposed in the housing and defines a passage through which solid objects can pass. The tubular member includes a head portion at one end and a stem portion at the other end that is connected to a solid objects feed tube. Means are provided for retaining the tubular member in the opening in the housing for movement relative to the housing during the coupling and uncoupling of the master and tool assemblies to accommodate misalignment of the master and tool assemblies. Another apparatus is disclosed for passing solid objects from a source to a work tool. The apparatus comprises first and second housings mounted on a master assembly and tool assembly, each housing tubular members. A robotic tool changing system is also provided for exchanging tools on an end of a robot arm, including a tool for attaching fasteners from a fastener source transported through feed tubes connected to the stem portions of the tubular members. The tubular members can move relative to the longitudinal axis of the respective housings and rotate freely about the axis when in contact with an arcuate bearing surface that partially defines the opening in the housing. Contact faces of the tubular members are formed to allow relative movement of the tubular members when the tubular members are engaged.

23 Claims, 8 Drawing Sheets

U.S. PATENT DOCUMENTS

| | | |
|---|---|---|
| 4,662,206 A | 5/1987 | Mauer et al. |
| 4,664,588 A | 5/1987 | Newell et al. |
| 4,676,142 A | 6/1987 | McCormick et al. |
| 4,716,647 A | 1/1988 | Winkler et al. |
| 4,763,401 A | 8/1988 | Marinoni et al. |
| 4,784,421 A | 11/1988 | Alvité |
| 4,792,655 A | 12/1988 | Ettinger |
| 4,793,053 A | 12/1988 | Ziccaro et al. |
| 4,811,881 A | 3/1989 | Heck |
| 4,815,780 A | 3/1989 | Obrist |
| 4,852,242 A | 8/1989 | Tella et al. |
| 4,869,136 A | 9/1989 | Easter et al. |
| 4,885,836 A | 12/1989 | Bonomi et al. |
| 4,906,123 A | 3/1990 | Weskamp et al. |
| 4,990,022 A | 2/1991 | Watanabe et al. |
| 4,993,139 A | 2/1991 | Burry et al. |
| 4,998,606 A | 3/1991 | McCormick et al. |
| 5,004,141 A | 4/1991 | Young et al. |
| 5,014,876 A | 5/1991 | Young et al. |
| 5,018,266 A | 5/1991 | Hutchinson et al. |
| 5,044,063 A | 9/1991 | Voellmer |
| 5,104,024 A | 4/1992 | Brewer et al. |
| 5,192,844 A | 3/1993 | Todd et al. |
| 5,219,318 A | 6/1993 | Vranish |
| 5,384,445 A | 1/1995 | Nakagami |
| 5,400,942 A | 3/1995 | Gast et al. |
| 5,405,485 A | 4/1995 | Henderson et al. |
| 5,454,775 A | 10/1995 | Cullen et al. |
| 5,460,536 A | 10/1995 | Cullen |
| 5,512,726 A | 4/1996 | Arantes et al. |
| 5,779,127 A | 7/1998 | Blacket et al. |
| 5,779,609 A | 7/1998 | Cullen et al. |
| 5,782,571 A | 7/1998 | Hufford et al. |
| 5,806,833 A * | 9/1998 | Riibe .................... 285/146.2 |
| 5,813,114 A | 9/1998 | Blacket et al. |
| 5,848,547 A | 12/1998 | Hite |
| 5,848,859 A * | 12/1998 | Clark et al. .................... 901/41 |
| 5,954,623 A | 9/1999 | Davis |
| 6,069,415 A | 5/2000 | Little et al. |
| 6,073,512 A | 6/2000 | McCormick et al. |
| 6,082,923 A | 7/2000 | Maughan |
| 6,375,378 B1 * | 4/2002 | Kitaura .................... 901/41 |

* cited by examiner

STUD WELDING TOOL CHANGER

BACKGROUND

The present invention relates generally to an apparatus for transferring solid objects through a robotic tool changer, and more particularly to an apparatus for transferring solid objects through a stud welding tool changer for use in a robotic tool changing system.

Stud welding and riveting are becoming more prevalent as the preferred fastening method used to build products from sheets of metal, particularly in automobile body manufacturing. When these processes are automated, a fastener, such as a "stud" or rivet, is fed through a flexible hollow tube by means of air pressure and delivered to a gun which then attaches the fastener to the metal sheet.

When industrial robots are used, for example in a stud welding application, a robot is programmed to position a welding gun to the desired weld location and to automatically produce stud welds without the need for an operator. During the manufacturing process, it may become necessary to exchange stud welding guns to obtain a different weld, attach different size fasteners or due to system failure or periodic maintenance. Gun exchanges are accomplished automatically using a robotic tool changing system.

A robotic tool changing system provides the means for a robot or other automatic machine to easily exchange tools as required for different jobs. The tool changing system is made up of two primary assemblies, a master assembly and a tool assembly. The master assembly is attached to the arm of the robot while the tool assembly is attached to various tools to be used by the robot. The tools and associated tool assemblies are positioned in stands within the working range of the robot. When effecting a tool change, the robot is programmed to place a tool on the end of the robot arm into the stand, remove the master assembly from the tool assembly and tool, and then accurately align the master assembly relative to a different tool assembly mounted on an appropriate tool in the stand and couple the master assembly to the tool assembly. All of the system resource and utility lines interface through the adapter assemblies. Thus, when the adapter assemblies are coupled together, they provide mechanical, electrical, pneumatic and, other service and signal connections between a source connected to the master assembly and the tool attached to the tool assembly.

Robotic tool changing systems designed for interchanging stud welding guns must transfer a stud between the master assembly and the tooling adapter assembly. Generally, this is accomplished by attaching a feed tube from a source of fasteners to a cylindrical conduit in the master assembly and a feed tube from a cylindrical conduit in the tool assembly to the gun. The cylindrical conduits slip together, one within the other, when the master and tool assemblies are coupled together thereby forming a continuous passage through the adapter assemblies for passing fasteners.

Conventional robotic tool changing systems have deficiencies related to the repetitive positioning accuracy of the master and tool assemblies. While the robot movements are designed to be very precise, the reality of the production line environment and the manufacturing tolerances of the various parts of the system can lead to misalignment of the tool position in the stand. Moreover, the tool assemblies and associated tools may not be the same and yet they must mate to the same master. For example, if the stud welding operation requires that a different size stud be passed, a bigger different gun must be picked up. As a result, the master and tool assemblies are designed so that the assemblies do not have to be exactly aligned, horizontally and angularly, for coupling. To facilitate self-alignment during coupling, the master and tool assemblies are often provided with locating or guide pins having conical forward ends and guide holes, respectively. The diameter of the guide holes is greater than the diameter of the pin ends so that, when the adapter assemblies come together, the pins at least partially engage in the guide holes to bring the assemblies into alignment upon coupling.

Nevertheless, slight misalignment is unsatisfactory in stud welding applications where the cylindrical ends of the stud feed conduits through the master and tool adapter assemblies must interengage. Even a small misalignment of the assemblies can cause the two cylindrical mating surfaces to jam during coupling and uncoupling of the adapter assemblies.

The effect of misalignment can be reduced by minimizing the distance between the stud feed tube conduits and the central axis of the master and tool assemblies. However, the stud tube is usually made from semi-rigid plastic which requires bends to have a significant radius. This requirement weighs in favor of locating the stud feed conduits as far as possible from the tool changer axis. Further, even when the assemblies are successfully coupled, substantial strain is placed at the rigid connection of the feed tube and the tool changer assemblies which renders this area of the tube prone to premature failure.

For the foregoing reasons, there is a need for an apparatus for transferring solid objects in a robotic tool changing system which couples smoothly even when there is misalignment of the master and tool assemblies. The new solids transferring apparatus should allow location at a selected distance from the axis of the tool changer. The new tool change system should also minimize strain on the feed tube at the connection of the assemblies.

SUMMARY

Therefore, it is an object of the present invention to provide an apparatus for transferring solid objects through a robotic tool changer which accommodates misalignment of the master and tool assemblies.

A further object of the present invention is to provide an apparatus for transferring solid objects through a robotic tool changer which smoothly couple and uncouple during tool changes even if the master and tool assemblies are misaligned.

Another object of the present invention is to provide an apparatus for transferring solid objects through a robotic tool changer which may be located a selected distance from the central axis of the tool changer to maximize allowable bend radius of the feed tube. A related object is provide an apparatus for transferring solid objects through a robotic tool changer which has some compliance when the master and tool assemblies are coupled for relieving strain on the feed tube at the connection and increasing the life of the feed tube.

According to the present invention, an apparatus for passing solid objects is provided for use in a robotic tool changing system. The apparatus comprises a housing adapted to be mounted on either of the master assembly or the tool assembly. A tubular member is disposed in the housing and defines a passage for permitting solid objects to pass through. The tubular member includes a head portion at one end and a stem portion at the other end. The head portion of the tubular member has a planar face and a rounded side surface extending from the face to the stem portion and the stem portion is adapted to be connected to a solid objects feed tube. Means are provided for retaining the tubular member in the opening in the housing for movement relative to the housing during the coupling and uncoupling of the master and tool assemblies to accommodate misalignment of the master and tool assemblies.

Also according to the present invention, an apparatus is disposed between a work tool and an instrumentality controlling the work tool for passing solid objects from a source to the work tool in a robotic tool changing system. The apparatus comprises first and second housings adapted to be mounted on the master assembly and tool assembly. Tubular members are disposed in each housing. Each tubular member defines a passage for permitting solid objects to pass through the tubular members. The tubular members include a head portion at one end and a stem portion at the other end. Each the head portion has a planar face and a rounded side surface extending from the face to the stem portion, and each of the stem portions are adapted to be connected to a solid object feed tube. Means are provided for retaining the tubular members in the openings in the housings for movement relative to the housing during the coupling and uncoupling of the master and tool assemblies to accommodate misalignment of the assemblies. Coupling of the master assembly to the tool assembly causes the planar faces of the tubular members to engage for defining a passageway for passing solid objects through the tubular members.

Further according to the present invention, a robotic tool changing system is provided for exchanging tools on an end of a robot arm, including a tool for attaching fasteners from a source of fasteners. The system comprises a master assembly for attaching to the end of the robot arm, a tool assembly for attaching to the fastener attaching tool and means for operatively coupling the tool assembly to the master assembly. Housings are mounted on the master assembly and tool assembly, each of the housings having an opening therethrough. Tubular members defining a passage for permitting fasteners to pass through the tubular members are disposed in the housings. The tubular members include a head portion at one end and a stem portion at the other end. The head portions have a planar face and a rounded side surface extending from the face to the stem portion. The tubular members are retained in the openings in the housings for movement relative to the housings during the coupling and uncoupling of the master and tool assemblies to accommodate misalignment of the assemblies. Feed tubes are connected to the stem portions of the tubular members for transporting fasteners from a source of fasteners to the first tubular member and from the second tubular member to the fastener attaching tool. Coupling of the tool assembly to the master assembly causes the planar face of the first tubular member to operatively engage the planar face of the second tubular member for defining a conduit through the tubular members to allow a fastener to be transported from the source of fasteners through the conduit and feed tube to the fastener attaching tool.

A feature of the new apparatus for passing solid objects is an arcuate bearing surface partially defining the opening in the housing for mating contact with the arcuate outer surface of the head portion of the tubular members. When engaged, the tubular members can move relative to the central longitudinal axis of the housings and rotate freely about the axis when in contact with the bearing surface. In addition, the contact faces of the tubular members are formed to allow relative movement of the tubular members when the tubular members are engaged. A portion of the stem portion of each tubular member extends from the opening at one end of the housings and has an annular groove. One embodiment of the retaining means comprises a snap ring disposed in the groove, the diameter of the snap ring being larger than the diameter of the opening in the one end of the housing. The groove is positioned for allowing relative axial movement of the tubular member in the housing.

The apparatus for passing solid objects of the present invention also features means for sealing the engaged contact faces of the tubular members and passageway against fluid leakage. In one embodiment, the sealing means comprises an o-ring disposed in the contact face of one of the tubular members around the opening to the passage in the tubular member. When the tubular members are engaged, the o-ring forms a raised seat configured to engage the contact face of the other tubular member and thereby form a fluid tight seal at the contact faces. Means are provided for biasing at least one of the tubular members against the other for generating contact pressure between the contact faces.

The present invention thus provides for a robotic tool changing system an apparatus for transferring solid objects which couples and uncouples smoothly even when there is misalignment of the master and tool assemblies. As a result, the solid objects transfer apparatus may be located a selected distance from the axis of the tool changer. Moreover, the coupled transfer apparatus has axial and rotational degrees of freedom that adds compliance at the feed tube connection thereby reducing strain on the connection at the assemblies.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper", "lower", "left", "right", "horizontal", "vertical", "upward" and "downward" merely describe the configuration shown in the figures. It is understood that the components may be oriented in any direction and the terminology should be understood as encompassing such variations unless specified otherwise.

The term robot is intended to mean an automatic handling or manipulating device with articulated arms effecting movements in space, operated by a hydraulic plant and an electrical or electropneumatic drive. A "robotic tool changing system" is understood to mean a device comprising a master mounted on the robot arm and a tool mounted on pneumatically or electrically operated tools for exchangeably mounting a tool to the robot. The expression "tool" shall be understood in its broadest sense to mean not only working tools like welding machines, drilling machines, power operated screwdrivers, and the like, but also gripping pliers, vacuum grippers, means for applying adhesive to a work piece, measuring test instruments, loading and unloading devices for work piece pallets, and the like. The robotic tool changing system allows for the automatic exchange of tools necessary to perform these varied tasks.

Figure 1:
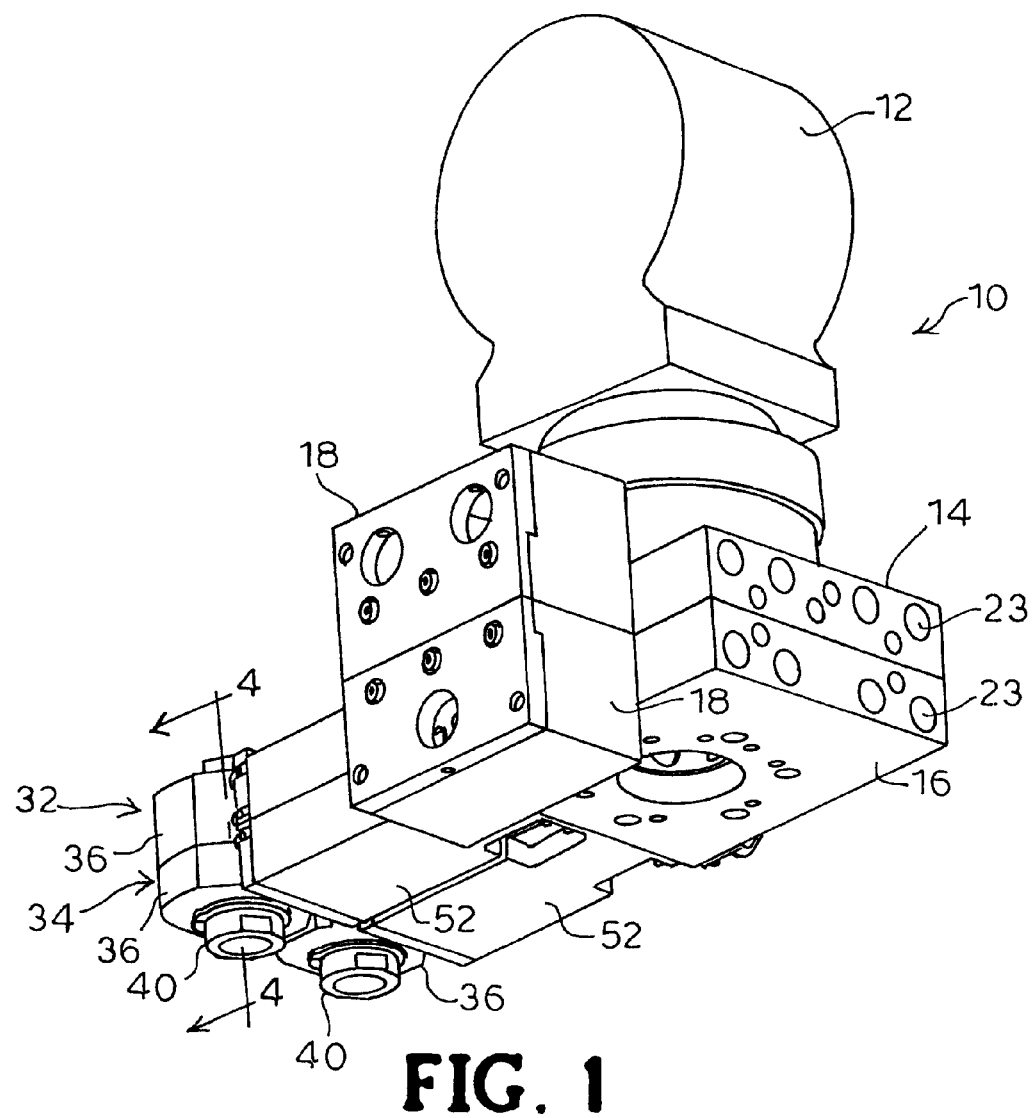
FIG. 1 is a perspective view of a robotic tool changing system having features of the present invention.
Figure 2:
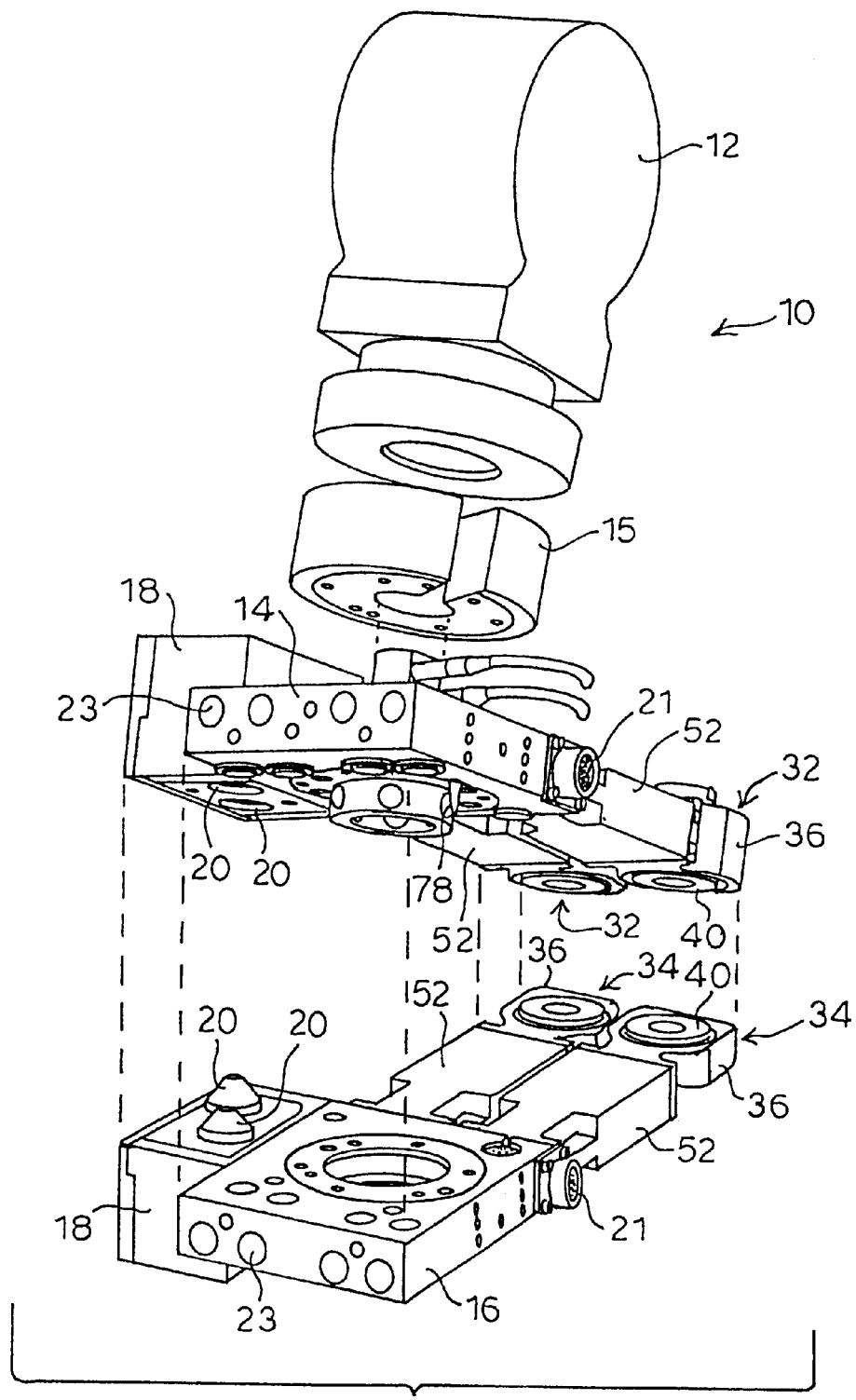
FIG. 2 is a perspective exploded view of a robotic tool changing system as shown in FIG. 1.

Referring now to FIGS. 1 and 2, there is shown a robotic tool changing system 10 having features of the present invention which facilitates the automatic exchange of tools on an end of a robot arm 12, including a tool (not shown) for attaching fasteners from a source of fasteners. The tool changing system 10 includes a master assembly 14 for attaching to the end of the robot arm 12. An interface plate 15 having the mounting pattern for a given robot arm is attached to the face of the robot arm 12 and the master assembly 14 is attached to the interface plate 15. A tool assembly 16 is shown for attaching to a number of different tools including, in the present invention, a fastener attaching tool such as a stud welding gun. Means are provided for releasably coupling the tool and master assemblies 14, 16 to each other as is known in the art.

Each adapter assembly also includes an electric power module 18 removably secured to each of the adapter assemblies 14, 16. The modules 18 are mateable when the adapter assemblies 14, 16 are coupled. Each power module 18 has high power electrical contacts 20 so that electrical power can be supplied from a remote source through the tool changing system 10 to operate the stud welding gun. Suitable power modules 18 and contacts 20 are shown and described in U.S. Pat. No. 6,116,966, the contents of which are hereby incorporated by reference.

Other utilities may conventionally extend from both the master and tool assemblies so that various operations can be performed by the robotic system. For example, electrical signal cable from a remote controller facilitates the transfer of input/output (IO) control signals from a computer controller via male and female pin connectors 21 on the master and tool assemblies 14, 16 for control of the tool changing system 10. Pneumatic lines also extend from a remote source and pass through valved ports 23 on the assemblies to provide a flow of fluid to the gun. Similarly, air and fluid lines may be connected at the ports 23 in the assemblies 12, 14 to blow off debris and other waste and provide a flow of fluxing or anti-smut liquid, respectively, for cleaning and preparing a weld surface. For the sake of simplicity, the utility lines are not shown.

Greater detail regarding the interconnections and operations of the robotic tool changing system may be found in the Product Manual for the Stud-Welding Tool Changer (9610-20-1017-02) of ATI Industrial Automation of Peachtree Center, 503-D Highway 70 East, Garner, N.C. 27529, the disclosure of which is hereby incorporated by reference. Currently, the ATI tool changer is preferred for use in the integrated stud welding robotic tool changing system of the present invention. However, it should be understood that the solid objects transferring apparatus of the present invention is in no way limited to any particular model or type of robotic tool changing equipment. It is understood that the present invention has been designed for use with any automated or manual tool changing system where it is desired to pass solid objects, such as fasteners, through the tool changing assemblies.

According to the present invention, an apparatus 30 for passing solid objects for use in the robotic tool changing system 10 is provided, two of which are shown in FIGS. 1 and 2. The apparatus 30 includes two fastener passing subassemblies, a master passage subassembly 32 which may be mounted to the master assembly 14 and a tool passage subassembly 34 which may be mounted to the tool assembly 16. The subassemblies 32, 34 are conjoined when the adapter assemblies 14, 16 are coupled to form a passage for passing solid objects through the tool changing system 10.

Figure 3:
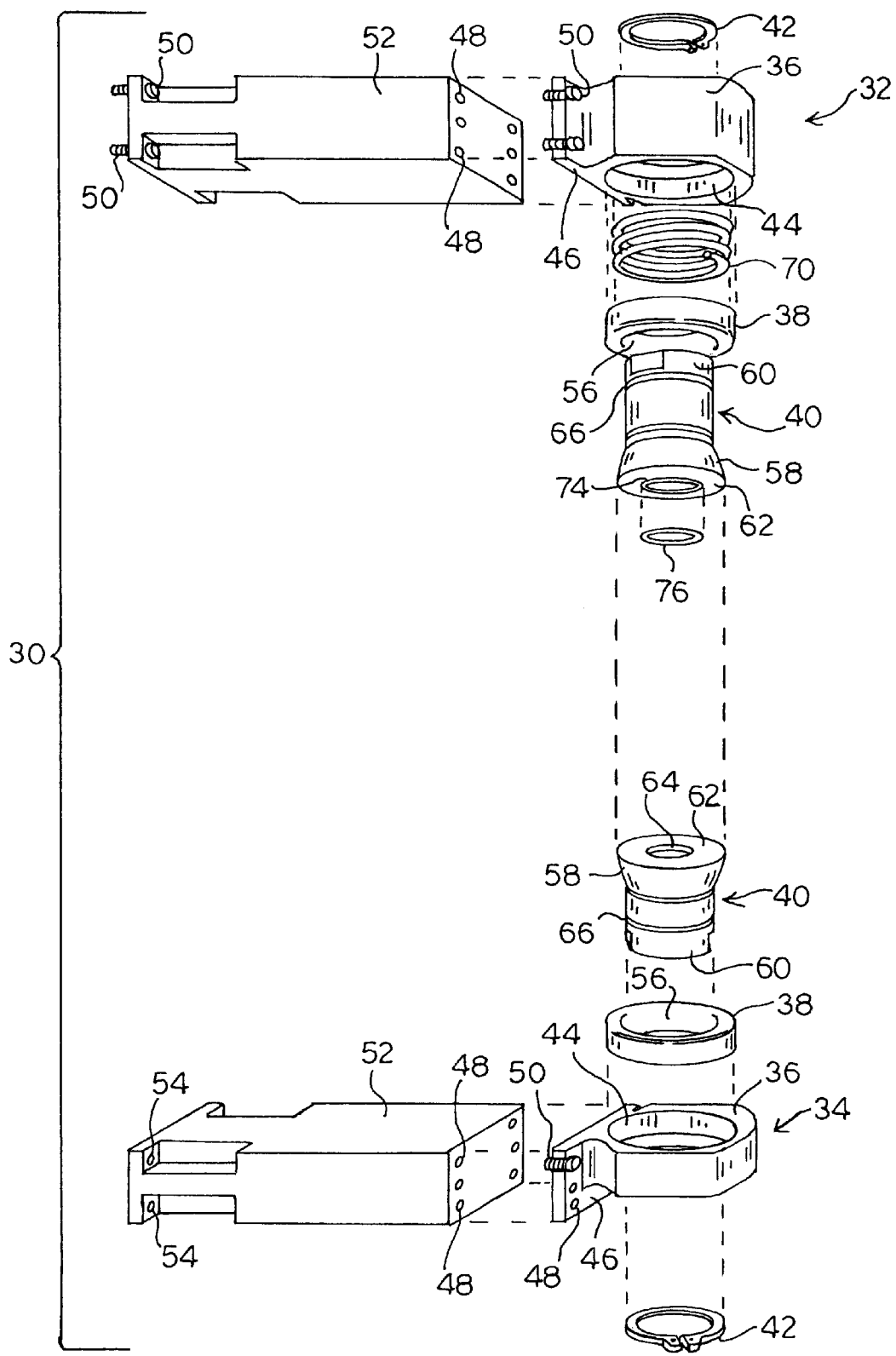
FIG. 3 is an exploded elevation view of an apparatus for passing solid objects in a robotic tool changing system.

Referring to FIG. 3, each passage subassembly 32, 34 includes a housing 36 for attachment to the robot and tool assemblies 14, 16, respectively, a bearing member 38, a tubular passage member 40 and a spring clip 42. The housing 36 includes a base portion 46 having holes 48 for receiving fasteners 50 for securing the housing to the robot and tool assemblies 14, 16. The housings 36 may be attached directly to the robot and tool assemblies 14, 16. An extender arm 52 may optionally be provided between the housing 36 and adapter assemblies 14, 16 for locating the housing 36 a predetermined distance from the adapter assemblies 14, 16. The extender arm 52 is provided with the appropriate fastener openings 54 for connection between the housing 36 and the adapter assemblies 14, 16. It is understood that although the housings 36 and extender arms 52 are shown attached to the adapter assemblies 14, 16, they may be integrally formed with the adapter assemblies. However, interchangeable extender arms 52 are preferred, which makes the system modular allowing the user to locate the housings 36 a selected distance from the master and tool assemblies 14, 16.

The housing 36 has a stepped cylindrical opening 44 therethrough. A shoulder 45 is formed where the diameter of the opening changes. The bearing member 38 is ring-shaped and has a rounded inner surface 56. The bearing member 38 is rotatably disposed in the larger diameter end of the opening 44 in the housing 36 against the shoulder 45.

The tubular passage member 40 is a generally cylindrical piece, including a head portion 58 at a first end and a neck portion 60 at a second end. The head portion 58 of the tubular passage member 40 has a contact face 62. The outer surface of the head portion 58 rounds down from the periphery of the face 62 to the circumference of the smaller neck portion 60 thus forming a truncated hemisphere. The tubular passage member 40 defines a conduit 64 (FIG. 4) extending axially therethrough from the first end to the second end. The conduit 64 is preferably circular in cross-section, with a constant diameter, for passing solid objects such as fasteners from a remote source (not shown).

The tubular passage member 40 is disposed within the opening 44 in the housing 36 so that the neck portion 60 extends outwardly of the opening. The diameter of the opening 44 in the housing 36 is larger than the diameter of the neck portion 60 of the tubular passage member 40 so that a radial gap 68 is formed. The gap 68 allows some the tubular passage member to tilt in any direction and complete rotational freedom about the axis of the tubular passage member 40. A circumferential groove 66 is provided in the neck portion 60 of the tubular passage member 40 for receiving the spring clip 42 for retaining the tubular passage member 40 and bearing member 38 in the housing 36. The groove 66 is located so that the tubular passage member 40 is allowed some axial movement relative to the housing 36. The rounded inner surface 56 of the bearing member 38 and the outer surface of the head portion 58 have corresponding shapes which are adapted to mate with each other when the head portion is substantially within the housing 36.

The neck 60 of each tubular passage member 40 is adapted to be connected to a feed tube (not shown) for transporting solid objects from the source of the solid objects to the master assembly 14 and from the tool assembly 16 to the tool. The neck 60 is internally threaded for receiving a male-threaded adapter at the ends of the feed tube. It is understood that any known means of connection maybe employed to secure the feed tube to the tubular passage members 40 as long as the means for connection provides a smooth transition for the transportation of solid objects between the feed tube and the tubular passage member.

Figure 6:
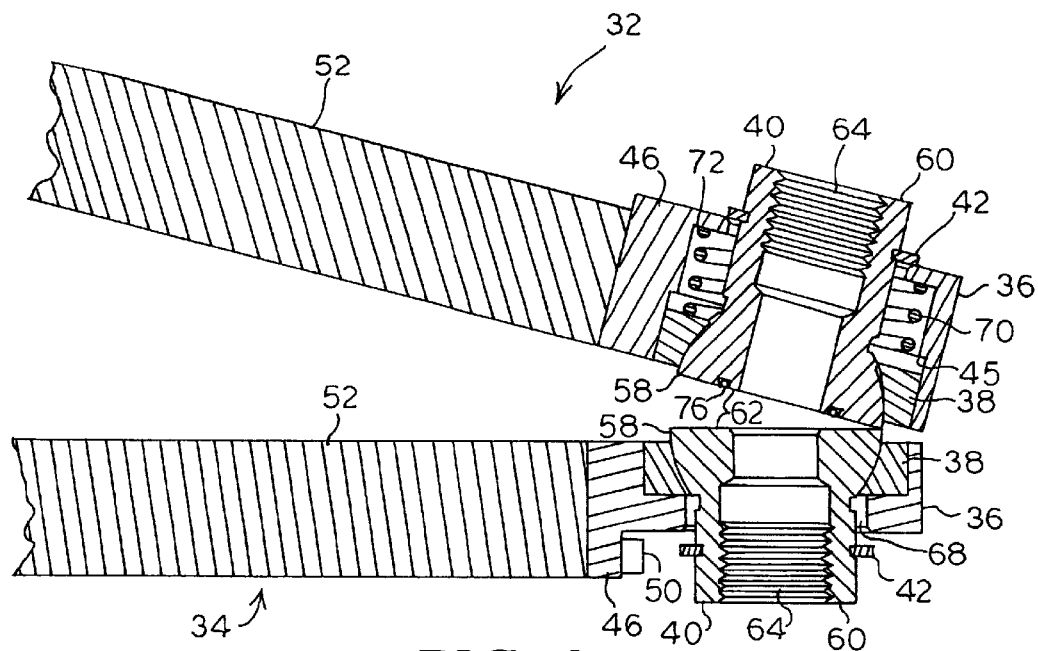
FIG. 6 is a side elevation in partial cross section of the apparatus for passing solid objects of the robotic tool changer shown in FIG. 1 prior to coupling and angularly misaligned.

A coil spring 70 is positioned around the neck portion 60 of one of the tubular passage members 40. The spring 70 is positioned in the housing 36 so that one end of the spring is positioned against the bearing member 38 in the housing and the other end against a lip 72 formed at the opening 44 in the second end of the housing. The spring 70 biases the bearing member 38 and tubular passage member 40 outwardly of the first end of the housing 36 to a position where the spring clip 42 contacts the second end of the housing (FIG. 6). Preferably, the coil spring 70 is in the housing 36 associated with the master assembly, but may be in the tool assembly 16 housing.

One of the tubular passage members 40 includes a circular groove 74 (FIG. 3) around the opening 64 in the contact face 62 of the head portion 58. An o-ring 76 is received in the groove 74 to provide a leak free seal when the tubular members 40 are joined. Preferably, the o-ring 76 is in the tubular member 40 associated with the master assembly 14. This is because when the tool assembly 16 and associated tool are not in use, the surface of the tool assembly 16, including the face 62 of the tubular member 40, is exposed and can be damaged or tampered with.

Figure 7:
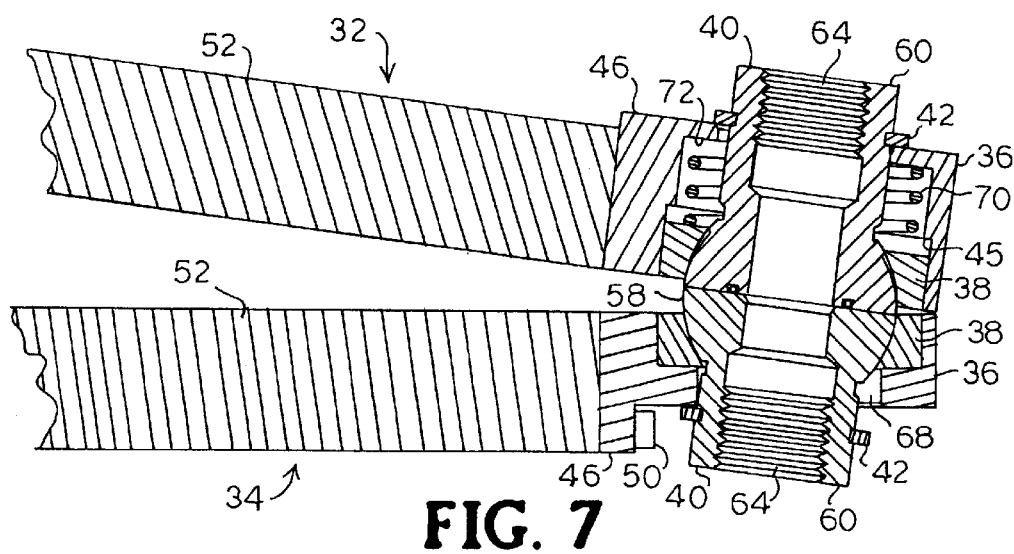
FIG. 7 is a side elevation in partial cross section of the robotic tool changer as shown in FIG. 6 after the lower tubular member has rotated in the housing to accommodate angular misalignment.

When the robot and tool passage subassemblies 32, 34 are attached to the master and tool assemblies 14, 16, the faces 62 of the respective tubular passage members 40 are generally in opposed relation (FIG. 6). As the master and tool assemblies 14, 16 come together for coupling, the faces 64 of the tubular passage members 40 engage. If the master and tool assemblies 14, 16 are initially misaligned, the tubular passage members 40 have the freedom to move in the housings 36 as the adapter assemblies align themselves with the help of the locating pins 78 so that the faces effectively engage. As seen in FIG. 7, the tubular member 40 associated with the tool assembly 16 tilts in the housing 36 to accommodate the angular misalignment of the assemblies.

Figure 8:
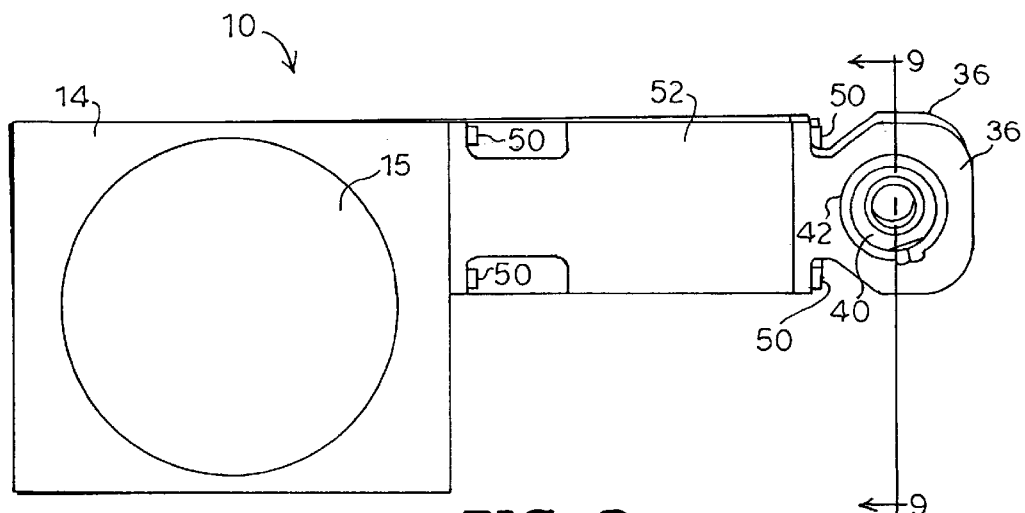
FIG. 8 is top plan schematic view of the robotic tool changer shown in FIG. 1 prior to coupling and radially misaligned.
Figure 9:
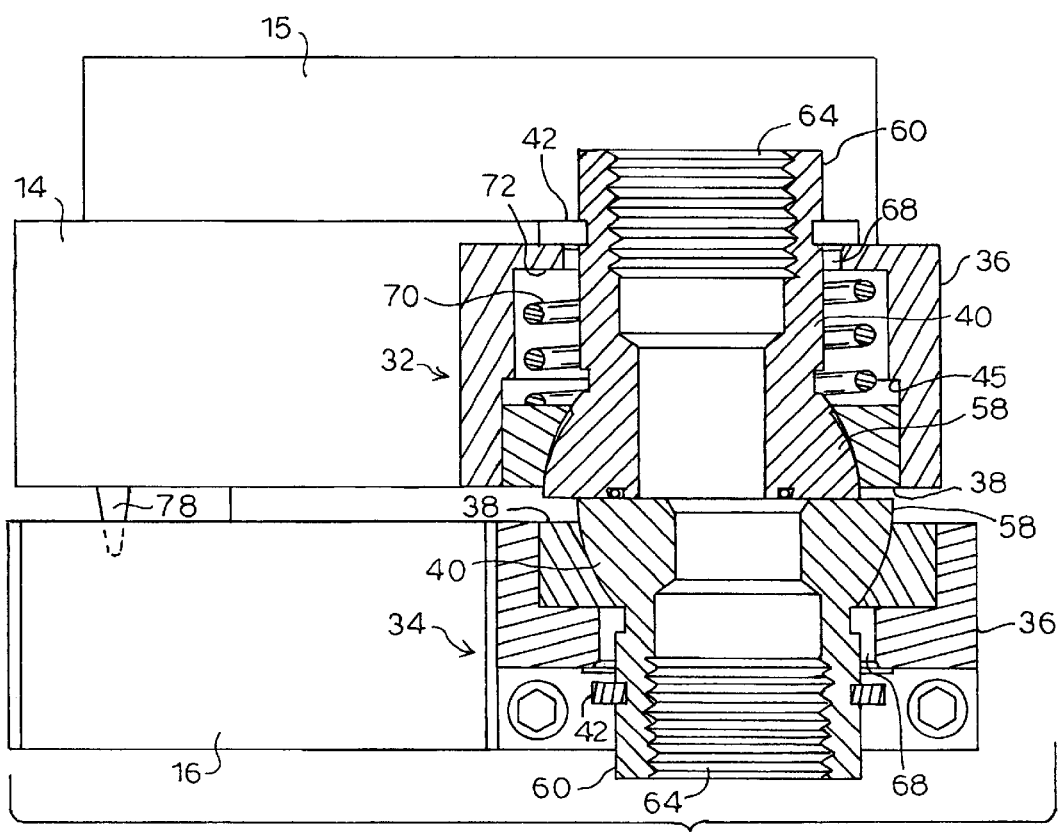
FIG. 9 is a section end elevation schematic view of the robotic tool changer taken along line 9—9 of FIG. 8.
Figure 10:
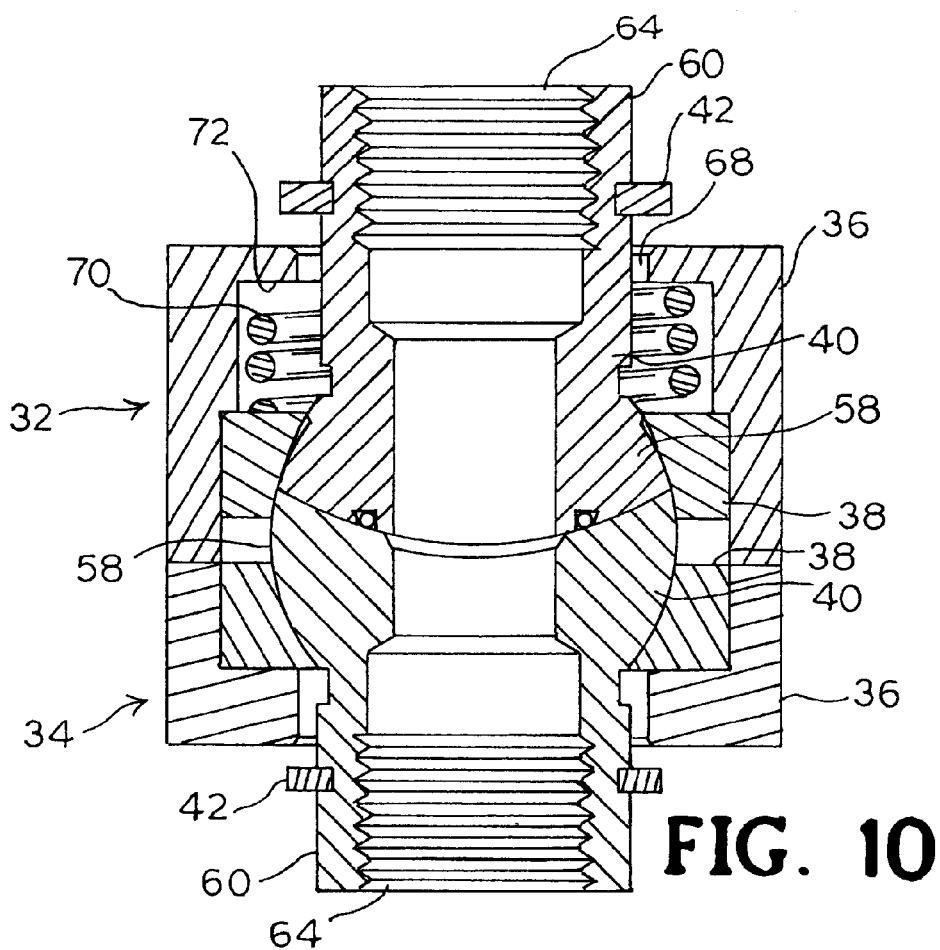
FIG. 10 is a section view of the apparatus for passing solid objects taken along line 4—4 of FIG. 1, but showing a further embodiment wherein one contact face is convex and the other is concave.
Figure 11:
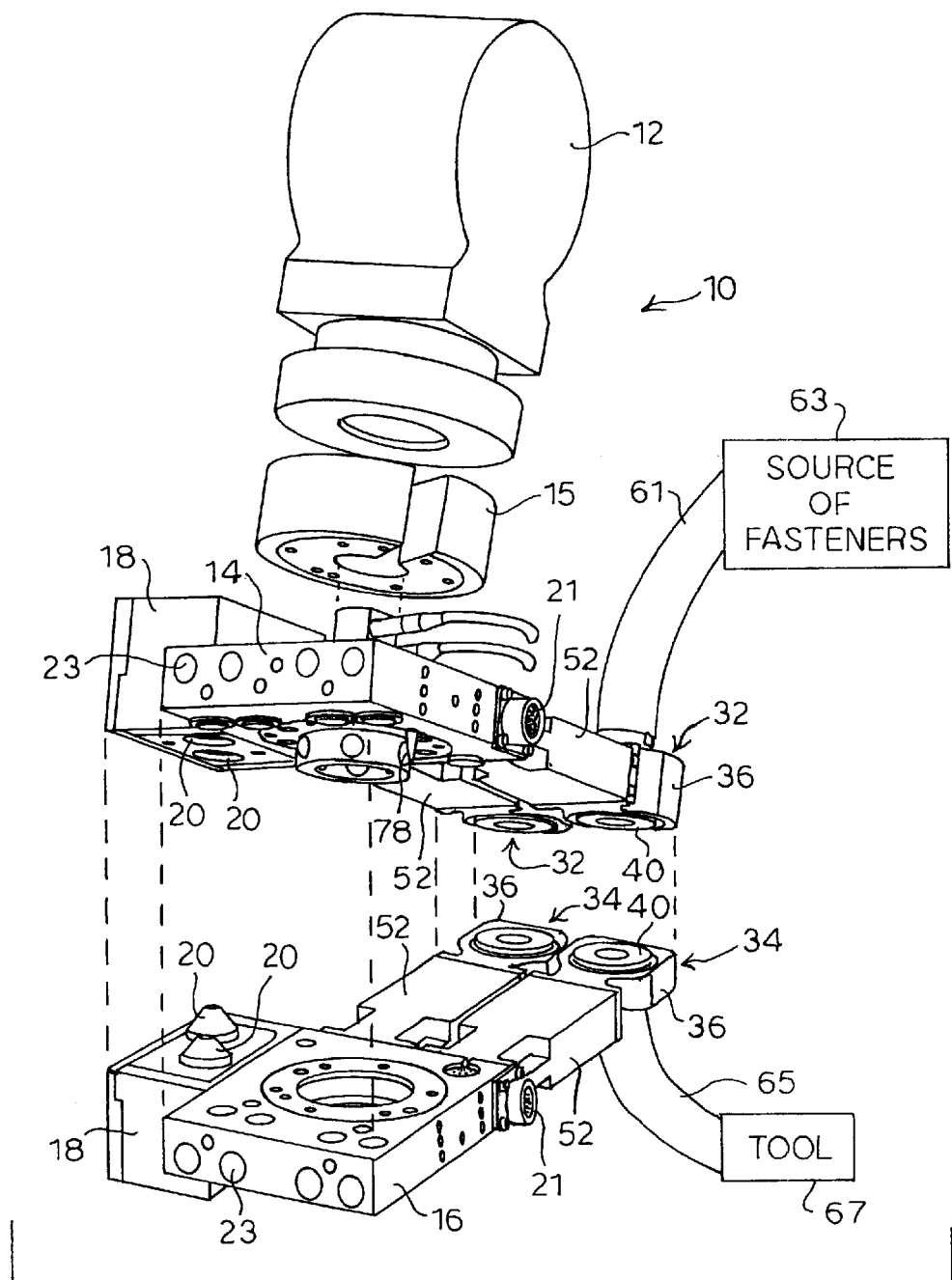
FIG. 11 is a perspective exploded view of a robotic tool changing system showing how the adapter assemblies are configured with respect to the fastener source, the feed tubes, and the tool.

FIGS. 8 and 9, show horizontal misalignment of the master and tool assemblies 14, 16 prior to coupling. As seen in FIG. 9, the locating pin 78 is partially within the guide hole in the tool assembly 16. As the assemblies 14, 16 continue to move toward one another they will align themselves. The contact faces 62 of the tubular members 40 will engage first. Because the faces 62 are substantially planar, they will slide relative to one another as the assemblies 14, 16 until coupling is achieved. It is understood that the contact faces 62 do not necessarily have to be planar as long as the faces are shaped for relative movement when they are engaged. For example, one face 62 could be concave and the other convex.

Thus, any misalignment between the adapter assemblies 14, 16, angular (FIGS. 6 and 7) or horizontal (FIGS. 8 and 9), is compensated for by the adjusting movements of the tubular passage members 40 relative to the housing when the passage subassemblies 32, 34 contact one another. Moreover, the adjusting movements of the passage members 40 can occur in all directions, including rotation, unimpeded by the contact faces 62 of the passage members.

When the tool changing system 10 is coupled (FIG. 4), the master passage subassembly 32 attached to the master assembly 14 and the tool passage subassembly 34 attached to the tool assembly 16 are also coupled. This forms the continuous conduit 64 between the ends of the conjoined tubular passage members 40 for passing solid objects through the adapter assemblies 14, 16. The contact faces 62 of the passage members 40 engage with the o-ring 76 between for sealing the union. The spring 70 associated with the one tubular member 40 biases the one tubular member 40 against the other so that the o-ring 76 seals the connection. Fasteners, for example studs in a stud welding operation, are delivered from a remote stud feeder from the feed tube, through the joined tubular members 40 and again into the feed tube to a stud welding gun.

Figure 4:
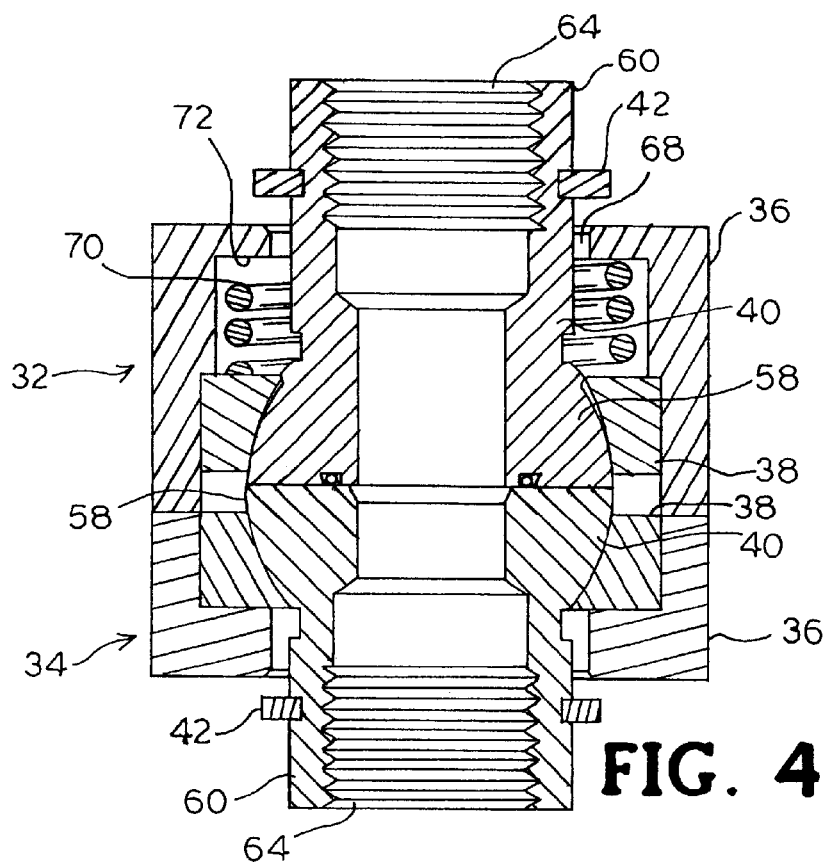
FIG. 4 is a section end elevation view of the apparatus for passing solid objects taken along line 4—4 of FIG. 1.
Figure 5:
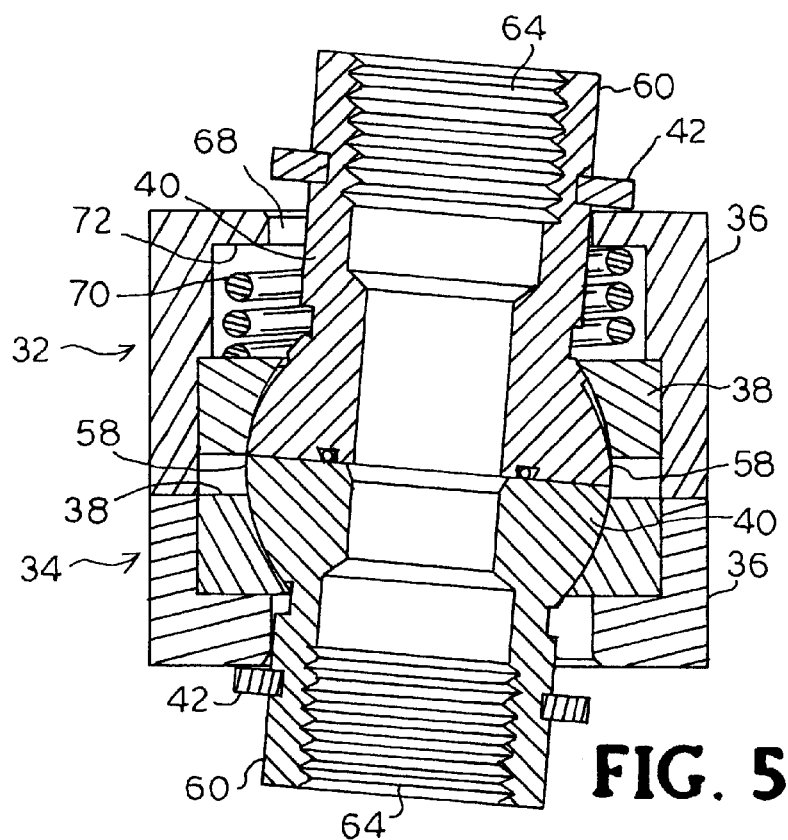
FIG. 5 is a section end elevation view of the apparatus for passing solid objects as shown in FIG. 4 with the tubular members rotated in the housings.

As seen in FIG. 4, the spring force on the associated tubular member 40 is overcome when the parts are coupled so that the tubular member 40 and bearing member 38 are moved inward of the housing 36 against the force of the spring 70 so that the bearing member 38 is driven against the shoulder 45 in the housing 36. The joined tubular subassemblies 32, 34 thus form a spring-loaded ball and socket joint that allows smooth articulation of the joined tubular members 40 in all directions in the housings 36 within the limits provided by the spring clips 42 (FIG. 5). Such movement effects adjustment of the tubular members 40 relative to the housing 36 to compensate for angular misalignment of the master and tool assemblies. These adjustment movements are possible due to the cooperating rounded surfaces of the bearing 38 and tubular passage member 40. In addition, a degree of axial and rotational compliance is accomplished when the passage members 40 are coupled which provides strain relief for the feed tube connections to the tubular members. Moreover, none of the adjusting movements effect the function of the device since the tubular passage members 40 remain engaged in any position by the force of the coil spring 70.

Because it may be desirable to produce different types of stud welds, or other fasteners, within a single robotic system, the present invention is in no way is limited to any specific number or size of passage subassemblies 32, 34 or feed tubes. There may be multiple sources of solid objects, and each source may contain a different size object or fastener. As a result, multiple robot and tool passage subassemblies, each with varying circumferences of passageways, may be provided in a tool changing system.

The previously described versions of the present invention have many advantages, including providing an apparatus for passing solid objects in a robotic tool changing system which is not effected by misalignment of the master and tool assemblies. Moreover, the solids transfer apparatus may be located a selected distance from the axis of the tool changer. Misalignment of the robot and tool assemblies does not effect the coupling of the passage members regardless of the offset distance. The passage subassemblies, once coupled, allow axial and rotational degrees of freedom to the feed tube connection. The compliant feed tube connection thus becomes less rigid when the adapter assemblies are coupled to relieve the strain on the feed tubes, particularly at the connection to the tubular members.

Although the present invention has been shown and described in considerable detail with respect to a particular exemplary embodiment thereof, it should be understood by those skilled in the art that we do not intend to limit the invention to the embodiment since various modifications, omissions and additions may be made to the disclosed embodiment without materially departing from the novel teachings and advantages of the invention, particularly in light of the foregoing teachings. For example, the present invention can be used with a manual tool changing system. Accordingly, we intend to cover all such modifications, omissions, additions and equivalents as may be included within the spirit and scope of the invention as defined by the following claims. In the claims, means plus function clauses are intended to cover the structures described herein as performing the recited function and not only structural equivalence but also equivalent structures. Thus, although a nail and a screw may not be structural equivalence in that a nail employs a cylindrical surface to secure wooden parts together, whereas a screw employs a helical surface, in the environment of fastening wood parts, a nail and a screw may be equivalent structures.

What is claimed is:

1. An apparatus for passing solid objects for use in a robotic tool changing system including a master assembly for attaching to the end of a robot arm, a tool assembly for attaching to a tool, means for coupling the tool assembly to the master assembly, and a feed tube for transporting solid objects, the apparatus for passing solid objects comprising:
   a housing adapted to be mounted on either of the master assembly or the tool assembly, the housing having an opening therethrough;
   a tubular member disposed in the housing and defining a passage for permitting the solid objects to pass through the tubular member, the tubular member including a head portion at one end and a stem portion at the other end, the head portion of the tubular member having a contact face and an arcuate outer surface extending from the face to the stem portion, the stem portion adapted to be connected to the feed tube; and
   means for retaining the tubular member in the opening in the housing and for accommodating movement of the tubular member relative to the housing during the coupling and uncoupling of the master and tool assemblies to accommodate misalignment of the master and tool assemblies.

2. An apparatus for passing solid objects as recited in claim 1, wherein the housing has an arcuate bearing surface partially defining the opening in the housing for mating contact with the outer surface of the head portion of the tubular member, wherein the tubular member can move relative to the central longitudinal axis of the housing and rotate freely about the axis when in contact with the bearing surface.

3. An apparatus for passing solid objects as recited in claim 1, wherein a portion of the stem portion of the tubular member extends from the opening at one end of the housing and has an annular groove, and the retaining means comprises a snap ring disposed in the groove, the diameter of the snap ring being larger than the diameter of the opening in the one end of the housing and the groove positioned for allowing relative axial movement of the tubular member in the housing when the snap ring is in the groove.

4. An apparatus for passing solid objects as recited in claim 3, further comprising means for biasing the tubular member to a first axial position relative to the housing so that the snap ring engages the one end of the housing.

5. An apparatus adapted to be disposed between a work tool and an instrumentality controlling the work tool to pass solid objects to the work tool for use in a robotic tool changing system including a master assembly for attaching to the end of a robot arm, a tool assembly for attaching to the tool, means for coupling the tool assembly to the master assembly, a first feed tube for transporting the solid objects from a source of the solid objects to the apparatus, and a second feed tube for transporting the solid objects from the apparatus to the tool, the apparatus for passing solid objects comprising:
   first and second housings adapted to be mounted on the master assembly and tool assembly, respectively, each of the housings having a central axis and an opening therethrough;
   first and second tubular members disposed in the housings and each defining a passage for permitting the solid objects to pass through the tubular members, the tubular members including a head portion at one end and a stem portion at the other end, each of the head portions of the tubular members having a contact face and an arcuate outer surface extending from the face to the stem portion, and each of the stem portions adapted to be connected to the respective feed tube; and
   means for retaining the first and second tubular members in the openings in the first and second housings, respectively, and for accommodating movement of the tubular members relative to the housing during the coupling and uncoupling of the master and tool assemblies to accommodate misalignment of the master and tool assemblies,
   wherein the coupling of the master assembly to the tool assembly causes the contact face of the first tubular member to engage the contact face of the second tubular member for defining a continuous passageway for passing solid objects through the tubular members.

6. An apparatus for passing solid objects as recited in claim 5, wherein each housing has an arcuate bearing surface partially defining the openings in the housings for mating contact with the outer surface of the head portion of the tubular members, wherein the engaged tubular members can move relative to the respective central longitudinal axis of the housings and rotate freely about the axis when in contact with the bearing surface.

7. An apparatus for passing solid objects as recited in claim 5, wherein the contact faces of the tubular members are formed to allow relative movement of the tubular members when the tubular members are engaged.

8. An apparatus for passing solid objects as recited in claim 7, wherein the contact faces of the tubular members are planar.

9. An apparatus for passing solid objects as recited in claim 7, wherein the contact face of the first tubular member is concave and the contact face of the second tubular member is convex.

10. An apparatus for passing solid objects as recited in claim 5, wherein a portion of the stem portion of each tubular member extends from the opening at one end of the housings and has an annular groove, and the retaining means comprises a snap ring disposed in each groove, the diameter of the snap rings being larger than the diameter of the opening in the one end of the housings and the grooves positioned for allowing relative axial movement of the tubular members in the housings when the snap rings are in the grooves.

11. An apparatus for passing solid objects as recited in claim 10, further comprising means for biasing at least one of the tubular members to a first axial position relative to the housing so that the respective snap ring engages the one end of the respective housing.

12. An apparatus for passing solid objects as recited in claim 5, further comprising means for sealing the engaged contact faces of the tubular members and passageway against fluid leakage.

13. An apparatus for passing solid objects as recited in claim 12, wherein the sealing means comprises an o-ring disposed in the contact face of one of the tubular members around the opening to the passage in the tubular member, the o-ring forming a raised seat configured to engage the contact face of the other tubular member and thereby form a fluid tight seal at the contact faces when the tubular members are engaged.

14. A robotic tool changing system for exchanging tools on an end of a robot arm, including a tool for attaching fasteners from a source of fasteners, the system comprising:

a master assembly for attaching to the end of the robot arm;

a tool assembly for attaching to the fastener attaching tool;

means for operatively coupling the tool assembly to the master assembly, the coupled assemblies having a central longitudinal axis;

first and second housings mounted on the master assembly and tool assembly, respectively, each of the housings having an opening therethrough;

first and second tubular members disposed in the housings and each defining a passage for permitting fasteners to pass through the tubular members, the tubular members including a head portion at one end and a stem portion at the other end, each of the head portions of the tubular members having a contact face and an arcuate outer surface extending from the face to the stem portion;

means for retaining the first and second tubular members in the openings in the first and second housings, respectively, and for accommodating movement of the tubular members relative to the housing during the coupling and uncoupling of the master and tool assemblies to accommodate misalignment of the master and tool assemblies; and first and second feed tubes connected to the stem portions of the first and second tubular members, respectively, for transporting fasteners from the source of fasteners to the first tubular member and from the exit port of the second tubular member to the fastener attaching tool, wherein the coupling of the master assembly to the tool assembly causes the contact face of the first tubular member to engage the contact face of the second tubular member for defining a conduit through the tubular members to allow a fastener to be transported from the source of fasteners through the first feed tube, the conduit, and the second feed tube to the fastener attaching tool.

15. An apparatus for passing solid objects as recited in claim 14, wherein each housing has an arcuate bearing surface partially defining the opening in the respective housing for mating contact with the respective side surface of the respective head portion of the tubular members, wherein the engaged tubular members can move relative to the central longitudinal axis of the housings and rotate freely about the axis when in contact with the bearing surfaces.

16. An apparatus for passing solid objects as recited in claim 14, wherein the contact faces of the tubular members are formed to allow relative movement of the tubular members when the tubular members are engaged.

17. An apparatus for passing solid objects as recited in claim 16, wherein the contact faces of the tubular members are planar.

18. An apparatus for passing solid objects as recited in claim 16, wherein the contact face of the first tubular member is concave and the contact face of the second tubular member is convex.

19. An apparatus for passing solid objects as recited in claim 14, wherein a portion of the stem portion of each tubular member extends from the opening at one end of the housings and has an annular groove, and the retaining means comprises a snap ring disposed in each groove, the diameter of the snap rings being larger than the diameter of the opening in the one end of the housings and the grooves positioned for allowing relative axial movement of the tubular members in the housings when the snap rings are in the grooves.

20. An apparatus for passing solid objects as recited in claim 19, further comprising means for biasing at least one of the tubular members to a first axial position relative to the housing so that the respective snap ring engages the one end of the respective housing.

21. An apparatus for passing solid objects as recited in claim 14, further comprising means for sealing the engaged contact faces of the tubular members and passageway against fluid leakage.

22. An apparatus for passing solid objects as recited in claim 21, where in the sealing means comprises an o-ring disposed in the contact face of one of the tubular members around the opening to the passage in the tubular member, the o-ring forming a raised seat configured to engage the contact face of the other tubular member and thereby form a fluid tight seal at the contact faces when the tubular members are engaged.

23. An apparatus for passing solid objects as recited in claim 21, further comprising means for biasing at least one of the tubular members against the other for generating contact pressure between the contact faces.

* * * * *